Sept. 13, 1966  J. P. HAAS  3,272,042
SLITTING AND SCORING APPARATUS
Filed Dec. 23, 1964
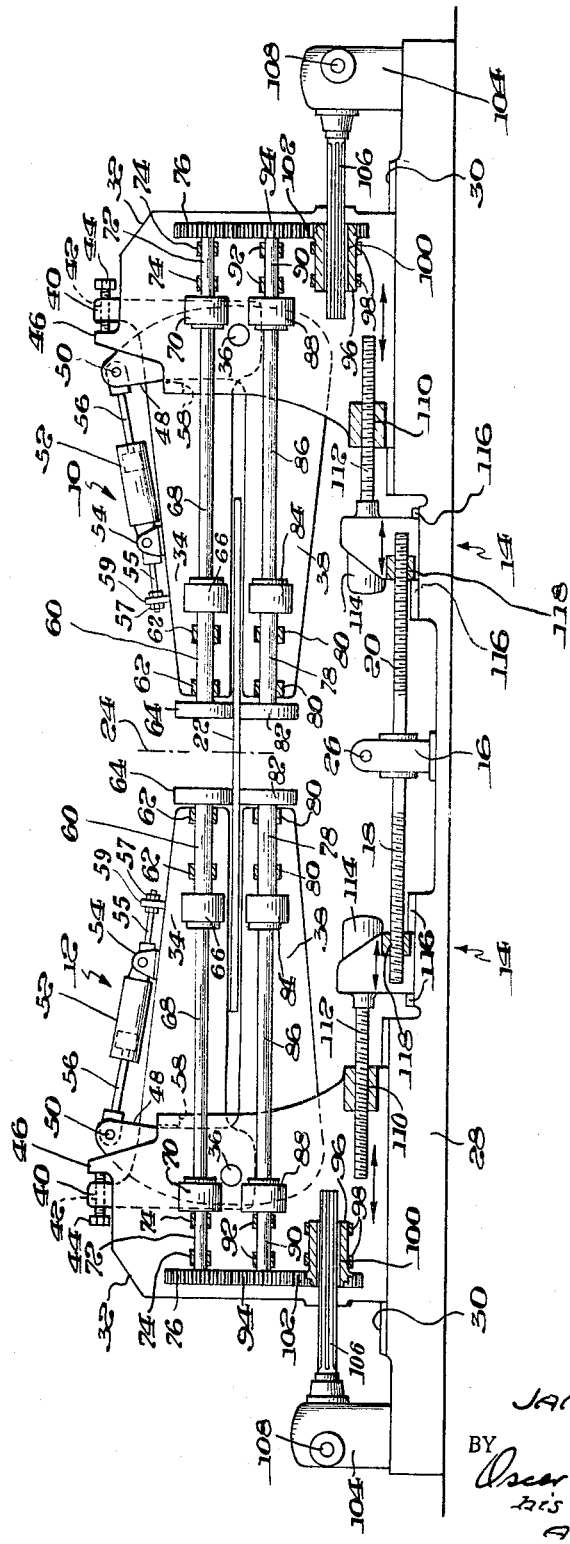
INVENTOR.
JAMES P. HAAS
BY
Oscar B Brumback
his
ATTORNEY 3,272,042
SLITTING AND SCORING APPARATUS
James P. Haas, Baltimore, Md., assignor to Koppers Company, Inc., a corporation of Delaware
Filed Dec. 23, 1964, Ser. No. 420,622
5 Claims. (Cl. 83—9)

This invention relates generally to apparatus for slitting and scoring a continuously moving web and more particularly to apparatus for slitting and scoring a continuously moving web of corrugated paperboard.

In the processing of sheet material, especially an endless web of corrugated paperboard, it is highly desirable to form the web as wide as possible and then slit the web into narrower strips as required. Score lines are also usually made in the web of corrugated paperboard at about the same time as the web is slit into preselected widths. The web forming apparatus is operated on a continuous basis and the operation is interrupted at such times as the slitting and scoring apparatus is adjusted to change the widths and lengths of the web material for the production of carton blanks of preselected size.

It is now possible to make rapid adjustments in the apparatus for cutting the continuous web into lengths of preselected dimension. With the presently known slitting and scoring apparatus, however, a substantial amount of time is required to adjust the apparatus for changing the widths of the strips cut from the web of corrugated paperboard and the score lines impressed on the respective strips. It is, therefore, highly desirable to provide apparatus for slitting and scoring the continuously moving web of corrugated paperboard that may be rapidly adjusted to change the widths of the strips cut or slit in a continuously moving web.

Slitting and scoring of a continuously moving web is now accomplished by a slitter-scorer device that includes three sets of shafts supported by spaced-apart side frames. The shafts have slitting and scoring heads mounted thereon. While the heads of one of the sets of shafts are slitting and scoring the moving web, the operator manually adjusts the heads of the two sets of inactive shafts to the desired transverse dimensions or spacing for subsequent slitting of the web into different sized strips. This manual adjustment of the slitter-scorer heads is both time consuming and difficult to perform. Further, with the known slitter-scorer devices, a plurality of sets of slitter-scorer heads are required when only one set is necessary to perform the operation.

The set-up time for the positioning or adjusting of the heads on the two sets of shafts that are not slitting and scoring the continuously moving web is excessive. With short orders, that is, where only a short length of the continuous web is slit and scored into the preselected widths, the operator does not have sufficient time to accurately adjust and set up the slitting and scoring heads on the inactive shafts for the next differently sized order. An interruption in the continuous process is usually required until the operator correctly adjusts the slitter-scorer heads on the inactive shafts.

Other problems are encountered in the presently known slitter-scorer devices. For example, the slitter and scorer heads are fabricated in halves and the halves are joined to each other with the drive shaft extending axially therethrough. The fabrication, positioning and replacement of slitter-scorer heads is expensive and time consuming. A unitary slitter-scorer head does not have the above discussed disadvantages. The presently known slitter-scorer devices are constructed with the drive shafts extending transversely across the apparatus so that the use of the unitary slitter-scorer heads is not feasible.

In the operation of the slitter-scorer apparatus it is highly desirable to provide a circumferential velocity for the slitter heads that is slightly higher than the speed of the web of corrugated paperboard moving therebetween. The circumferential velocity of the scorer heads, however, should be substantially equal to board speed. Where, as in the past, both the slitter and scorer heads are mounted on a common drive shaft, this optimum condition cannot be attained.

In the continuous manufacture of corrugated paperboard, the thickness of the board may vary under certain conditions. It is, therefore, highly desirable to have a slitter-scorer apparatus that is adjustable so that the slitter and scorer heads may be moved toward and away from each other to accommodate the changes in thickness of the continuously moving web of corrugated paperboard. the slitter-scorer apparatus herein described eliminates the above disadvantages in presently known slitter-scorer devices and may be inexpensively manufactured and operated with a minimum number of personnel. The slitter-scorer apparatus of this invention includes a means for rapidly adjusting the relative position of the sets of slitter-scorers and does not require additional inactive sets of slitter-scorers as has been the practice in the past.

Briefly, the invention includes a slitter or scorer apparatus composed of a plurality of units, each of the units having a pair of slitter or scorer heads drivingly connected to a pair of shafts supported by a laterally adjustable sliding frame. The sliding frame is oriented relative to the center line of the continuously moving web by an adjusting means. Separate and other adjusting means may be provided to conjointly adjust a plurality of slitter-scorer units relative to the continuously moving web. Drive mechanisms are provided for the pairs of slitter or scorer heads associated with each unit and the speed of rotation of the slitter or scorer heads may be independently or conjointly controlled. The slitter or scorer heads are connected to the end portions of the driving shafts so that they may be manufactured in a unitary fashion.

Accordingly, the principal object of this invention is to provide a slitter or scorer mechanism that is transversely adjustable relative to the longitudinal axis of a continuously moving web of corrugated paperboard.

Another object of this invention is to provide a plurality of slitter or scorer devices that may be separately or conjointly adjusted transversely relative to the longitudinal axis or center line of a continuously moving web of corrugated paperboard.

Another object of this invention is to provide slitter-scorer devices in which the slitter or scorer heads are movable toward and away from each other to adjust the spacing therebetween to accommodate corrugated paperboard of varying thicknesses.

Another object of this invention is to provide a slitter device in which the speed of the slitter heads may be selected so that the slitter heads may have a circumferential velocity higher than the speed of the continuously moving web of corrugated paperboard passing therebetween and the circumferential velocity of the scorer heads may be maintained at a speed substantially equal to the speed of the continuously moving web of corrugated paperboard passing therebetween.

These and other objects and advantages of this invention will be more completely disclosed and described in the following specification, the accompanying drawings and the appended claims.

The drawing is a view in side elevation of a pair of slitter-scorer units arranged in opposed relation on opposite sides of the continuous web of corrugated paperboard with the pairs of slitter-scorer heads facing each other.

Where a continuously moving web of corrugated paperboard is fed to the slitter-scorer device from a double backer, a common procedure is to split the continuously moving web into three separate strips. This requires four pairs of slitter heads. Two pairs of slitter heads are used to trim the edges of the continuously moving web and the other two pairs of slitter heads form continuous lengthwise slits or cuts in the web of corrugated paperboard.

It is conventional practice to score each strip at two locations so that a total of six pairs of scorer heads are required. The four pairs of slitter heads and six pairs of scorer heads are sufficient to accomplish a large percentage of the slitting and scoring operations required on presently known webs of corrugated paperboard. In many instances, however, fewer slitter heads and fewer scorer heads are required.

It is desirable, however, to provide the maximum amount of flexibility so that at least ten units should be provided at the end of the double backer. Five of the units may be located on the drive side of a conventional corrugator and five of the units on the opposite side of the corrugator. As will hereinafter be described, for any particular order the desired number of slitter and scorer heads are activated and brought into operative relation with the continuously moving web of corrugated paperboard.

In the drawing the figure illustrates generally a pair of slitter scorer units generally designated by the numerals 10 and 12. The slitter-scorer units 10 and 12 are of substantially the same construction and similar numerals will be used to designate similar parts. An adjusting means generally designated by the numeral 14 is used to properly orient the slitter and scorer heads relative to the continuously moving web of corrugated paperboard passing therethrough.

A worm gear box 16 may be provided with shafts 18 and 20 extending laterally therefrom. The shafts 18 and 20 are actuated by the worm gear box 16 and are threadedly connected to the adjusting means 14. As will be later described in greater detail, the adjusting shafts 18 and 20 are arranged to move the slitter-scorer devices 10 and 12 toward and away from the center line of the web 22, generally indicated by the vertical dash-dot-dash line 24. There may be provided a common shaft 26 associated with a plurality of worm gear boxes 16. It is possible to adjust all units, either associated in pairs as is illustrated in the figure, or in side by side relation, by the rotation of shaft 26 if the shaft 26 is common to all of the worm gear boxes 16.

In the drawing the pair of slitter or scorer units 10 and 12 are illustrated with the slitter or scorer devices facing each other on opposite sides of the web 22 with the adjusting shafts 18 and 20 extending laterally from a common worm gear box 16 to the adjusting mechanisms 14 associated with each of the units 10 and 12. It should be understood that the slitter-scorer units may be arranged in side by side relation on one side of the web 22; the drawing does, however, illustrate the versatile manner in which the units may be positioned in the processing line for a continuously moving web of corrugated paperboard.

The slitter or scorer units 10 and 12 have a common base 28 with pairs of transversely extending rails 30 adjacent the end portions. Where the units are arranged in side by side relation on one side of the web 22, the base 28 may be fabricated to support only one slitter or scorer unit and a worm gear box 16. The unit 10 has a slideable frame 32 positioned on the rails 30 and arranged to move reciprocally in the direction indicated by the arrow adjacent the lower portion of the slideable frame 32. An upper pivot arm 34 is pivotally secured to the frame 32 on a pivot pin 36 and is arranged to pivot both in a clockwise and counterclockwise direction about the pivot pin 36. A lower pivot arm 38 is also pivotally secured to the frame 32 by means of the same pivot pin 36. The upper pivot arm 34 has an upwardly extending portion 40 that has a threaded bore 42 extending laterally therethrough. An adjusting screw 44 extends through the bore 42 and abuts an upwardly extending shoulder 46 on frame 32. Thus, by adjusting the screw 44 the relative horizontal position of the upper pivot arm may be controlled. The shoulder 46 on frame 32 limits the downward movement of the upper pivot arm 34. The lower pivot arm 38 has an upwardly extending portion that has an aperture 50 therethrough.

A servomechanism 52 is pivotally secured to the upper pivot arm 34 by the upwardly extending clevis 54. A rod 56 extends outwardly from the servomechanism 52 and is pivotally connected to the lower pivot arm upwardly extending portion 48 by means of a pivot pin extending through the aperture 50. The servomechanism 52 provides a means for orienting the lower pivot arm 38 and for adjusting the pivot arms 34 and 38 relative to each other, as will be later described. The frame 32 has a horizontally extending stop portion 58 that is arranged to abut a portion of the lower pivot arm upwardly extending portion 48 and to limit the downward pivot action of the lower pivot arm 38. The pivot arms 34 and 38 are thus secured to the slideable frame 32 by means of the pivot pin 36 and are movable with the slideable frame 32.

The upper pivot arm 34 has a shaft 60 supported by bearings 62. A slitter or scorer generally designated by the numeral 64 is secured to an end of shaft 60 beyond the end portion of the upper pivot arm 34. The slitter or scorer device 64 is rotated by the shaft 60. The other end of shaft 60 is connected to a flexible coupling 66 suitably supported by the upper pivot arm. A spindle 68 is connected at one end to the flexible coupling 66 and at the other end to another flexible coupling 70. A shaft 72 axially aligned with spindle 68 is supported in bearings 74 and suitably supported on the slideable frame 32. The shaft 72, spindle 68 and shaft 60 are arranged in substantial axial alignment. The shaft 72 is connected at one end to flexible coupling 70 and has a gear 76 secured to the other end. Thus, shaft 60, flexible coupling 66, spindle 68, flexible coupling 70 and the shaft 72 drivingly connect slitter or scorer head 64 to the gear 76.

The lower pivot arm 38 has a shaft 78 rotatably supported thereon by bearings 80 and has a slitter or scorer head 82 connected to one end thereof beyond the end portion of the lower pivot arm 38. The slitter or scorer device 82 is rotated by the shaft 78. The other end of shaft 78 is secured to a flexible coupling 84 suitably supported by the lower pivot arm 38. A spindle 86 is positioned in substantial axial alignment with the shaft 78 and is connected at one end to the flexible coupling 84. The other end of spindle 86 is connected to a second flexible coupling 88 and suitably supported by the lower pivot arm 38. A shaft 90 is supported by bearings 92 in slideable frame 32 in substantial parallel relation with shaft 72 positioned thereabove. The shaft 90 has one end connected to the flexible coupling 88 and a spur gear 94 secured to the other end. The spur gear 94 is in meshing relation with spur gear 76. The slideable frame 32 has a tubular shaft 96 positioned below shaft 90 and rotatably supported by suitable bearings 98. The tubular shaft 96 has an internal splined bore 100 and a spur gear 102 secured to its outer peripheral portion. The gear 102 is in meshing relation with the gear 94 and is arranged to drive both gears 94 and 76 to rotate slitter-scorer heads 64 and 82.

Secured to the base 28 there is a driving gear box 104 that has a splined shaft 106 extending laterally therefrom. The splined shaft 106 extends through the splined bore 100 in tubular shaft 96 in a manner that the tubular shaft 96 rotates with shaft 106. The driving gear box 104 has a longitudinal shaft 108 associated therewith. The gearing within gear box 104 drivingly connects shaft 108 to the laterally extending shaft 106. When the units 10 are arranged in side by side relation on one side of the web 22, the shaft 108 may be connected to all of the gear boxes 104 and provide a common drive for the aligned units. If desired, however, a separate drive motor can be associated with each gear box 104. The gearing within gear box 104 may be so selected that when the unit has slitter heads associated therewith, the circumferential velocity of the heads is slightly higher than the velocity of the continuous web passing therebetween. The gearing 96, 94 and 76 may be so selected to also accomplish this velocity differential.

The sliding frame 32 has a threaded bore 110 adjacent its lower portion through which a threaded adjusting shaft 112 extends. The shaft 112 is connected to an adjusting means 114 such as an electric motor or the like that is arranged to rotate the threaded shaft 112 in either a clockwise or counterclockwise direction. The adjusting means 114 is operable through the rotation of the shaft 112 to reciprocally move or adjust the sliding frame 32 and the upper and lower pivot arms 34 and 38 associated therewith in the direction indicated by the arrow to move the slitter or scorer mechanism toward and away from the web center line 24. The adjusting means 114 is also slideably mounted on rails 116 on base 28. The threaded shaft 20 extending laterally from gear box 16 is threadedly secured in a threaded bore 118 in the base of the adjusting mechanism 114 so that rotation of the shaft 20 by the gear box 16 moves both the adjusting mechanism 114 and the slideable frame 32 toward and away from the web center line 24.

The upper and lower pivot arms 34 and 38 are so arranged on the slideable frame 32 that the scorer heads are urged downwardly by the weight of the arms 34 and 38. The adjusting screw 44 orients the upper pivot arm 34 and the upper slitter or scorer 64 relative to the web 22. The servomechanism 52 through its connection to both pivot arms 34 and 38 orients the pivot arm 38 relative to the pivot arm 34 and hence orients the lower slitter or scorer 82 relative to the upper slitter or scorer 64. The proper operative relative spacing between slitter or scorer devices 82 and 64 is obtained when pressure is applied to servomechanism 52 in such manner that rod 56 extends to its most outward position. Clevis 54 may be made adjustable within close limits to permit the precise positioning of slitter or scorer devices 64 and 82 with respect to each other. To this end, clevis 54 may be slideable in a conventional V-groove in arm 34 and be inverted and positioned by bolt 55 and nuts 57 against abutment 59. With this arrangement the relative spacing between the slitter or scorer devices 82 and 64 is controlled by the servomechanism 52. There is also provided a stop 58 on slideable frame 32 to limit the maximum downward movement of pivot arm 48. A clearance, of course, exists between stop 58 and arm 48 in normal operation.

To move the slitters or scorers 82 and 64 away from each other the servomechanism 52, which may be either a pneumatic or hydraulic cylinder, is actuated to move the rod 56 inwardly toward the cylinder portion of the servomechanism 52 and reduce the effective length of rod 56 to pull the lower pivot arm upwardly extending portion 48 in to abutting relation with the stop 58 on slideable frame 32. Further, movement of rod 56 inwardly into the servomechanism 52 rotates the upper pivot arm 34 in a clockwise direction and moves the slitter or scorer head 64 away from the slitter or scorer head 82. With this arrangement the units 10 and 12 can be automatically adjusted to move the pairs of slitter or scorer devices into and out of operative relation with the web 22 by actuating the servomechanism 52 on the respective units. The slitter or scorer heads 64 and 82 on the units 10 and 12 can be conjointly adjusted relative to the center line of the web 22 by the gear box 16 and separately by the separate adjusting mechanisms 114 associated with each of the units. Thus, with the units described, the operator can remotely (a) charge the spacing between the pairs of slitters or scorer heads to place them into or out of cooperative relation, (b) conjointly move a plurality of units and their associated slitter or scorer heads relative to the center line of the continuous web, and (c) separately adjust the relative position of the slitter or scorer heads on each unit relative to the center line of the continuous web.

*Operation*

The slitter or scorer units illustrated in the drawing operate in substantially the following manner. As previously discussed, a plurality of units similar to units 10 and 12 may be positioned in pairs with the slitter or scorer heads facing each other and on opposite sides of the web 22, as is illustrated, or the slitter or scorer devices may be positioned in side by side relation on one side of the web 22 and connected for common adjustment relative to the center line of the endless web of corrugated paperboard 22 by means of the gear boxes 16 and the common adjusting shaft 26.

Assuming, for example, that the heads 64 and 82 on units 10 and 12 are slitter heads arranged to separate the web of corrugated paperboard into three strips, the width of the intermediate strip is determined, and the adjusting mechanism 114 on both units 10 and 12 is actuated to move the slitter heads 64 and 82 preselected distances from the web center line indicated at 24. The servomechanism 52 has hydraulic pressure applied to the left side of the piston within the cylinder, as illustrated in unit 10, to orient the lower slitter head 82 relative to the web 22. In the oriented position of head 82, the lower pivot arm upwardly extending portion 48 is spaced from the stop 58 on slideable carriage 32 and rod 56 is in its most outward position. The upper slitter head 64 is oriented relative to the web 22 by means of adjusting screw 44. The operative spacing between slitter heads 64 and 82, however, is independent of the adjustment of screw 44. As the continuously moving web 22 passes between the slitter heads 82 and 64, the drive mechanism, through gear box 104, rotates the shaft 106 at a preselected speed. The rotation of shaft 106 is transmitted through gears 102, 94 and 76 to the slitter heads 82 and 64. Preferably, as previously discussed, the speed of rotation of shaft 106 is controlled through the gearing in gear box 104 so that the circumferential velocity of the slitter heads 64 and 82 is slightly higher than the speed of the continuously moving web of corrugated paperboard passing therebetween.

To move the slitter heads 64 and 82 away from each other to either deactivate the slitting operation performed by the respective slitter heads 64 and 82, or to move the slitter unit 10 to a new adjusted position relative to the center line 24 of the continuously moving web 22, the servomechanism 52 is actuated to move the rod 56 toward the cylinder portion of servomechanism 52. The first movement of the rod 56 moves the lower pivot arm upper portion 48 into abutting relation with the stop mechanism 58. Further movement of the rod 56 moves the upper pivot arm 34 in a clockwise direction to thereby move the slitter head 64 away from the web 22.

To conjointly adjust the relative dimension between the slitter heads 64 and 82 on the units 10 and 12 the adjusting shaft 26 connected to gear box 16 is activated. Rotation of shaft 26 activates both laterally extending adjusting shafts 18 and 20 through the gearing in gear box 16 to move both of the units 10 or 12 toward or away from the center line 24 of the continuous web 22. The rotation of the threaded adjusting shafts 18 and 20 moves the adjusting mechanisms 14 by means of the threaded bore 118 on the rails 116 along the threaded shafts 18 and 20. The adjusting mechanisms are connected to the slideable frame 32 by means of the lateral movement of the adjusting mechanism 114 which moves the slideable frame 32 with the pivot arms 34 and 38 connected thereto.

To individually adjust the slitter-scorer heads 64 and 82 relative to the web center line 24 the separate actuating mechanisms 114 are activated to rotate the threaded adjusting shafts 112. The slideable frame 32 is threadedly secured to the adjusting shaft 112 by means of the threaded bore 110 so that the sliding frame 32 will move laterally on rails 30 upon the rotation of the shaft 112. The driving mechanism for the slitter-scorer heads includes the splined shaft 106 coaxially arranged in the splined tubular shaft 90. With this arrangement the slideable frame 32 may move laterally relative to splined shaft 106 and drive from splined shaft 106 is transmitted through the respective gears as previously discussed.

It will be apparent with the previously described operation of the slitter-scorer apparatus that it is now possible to separately or conjointly adjust slitter or scorer heads relative to the center line of the continuous web of corrugated paperboard. It is also possible to automatically move the slitter or scorer heads into or out of engagement with the continuously moving web by a remotely actuated servomechanism.

According to the provisions of the patent statutes, the principal, preferred construction, and mode of operation of the invention have been explained, and what is now considered to represent its best embodiment has been illustrated and described. However, it should be understood that within the scope of the appended claims, the invention may be practiced otherwise than as specifically illustrated and described.

I claim:

1. A device for slitting and scoring a continuously moving sheet comprising
   a frame member having a pivot pin extending horizontally therefrom and stop means extending horizontally therefrom,
   an upper pivot arm pivotally secured to said frame member on said pivot pin and having an end portion extending laterally from said frame member,
   a lower pivot arm pivotally secured to said frame member on said pivot pin and having an end portion extending laterally therefrom positioned below said upper pivot arm member laterally extending portion, said lower pivot arm having an upwardly extending other end portion operable to abut said frame member stop means,
   means connected to said upper arm member laterally extending portion and said lower arm member upwardly extending other end portion, said means operable to urge said lower arm member other end portion into abutting relation with said stop means and to pivot said upper arm member about said pivot axis in a direction away from said continuously moving sheet,
   sheet engaging members secured to said upper and lower pivot arm laterally extending portions, said sheet engaging members arranged in a plane substantially normal to the longitudinal axis of said arm member laterally extending portions, and
   drive means to propel said sheet engaging members.

2. A device for slitting and scoring a continuously moving sheet comprising
   a frame member having a pivot pin extending horizontally therefrom, a first stop means adjacent the top portion of said frame, and second stop means extending horizontally therefrom below said first stop means,
   an upper pivot arm pivotally secured to said frame member on said pivot pin and having an end portion extending laterally from said frame member, said upper pivot arm having an upwardly extending other end portion operable to abut said first stop means on said frame member,
   a lower pivot arm pivotally secured to said frame member on said pivot pin and having an end portion extending laterally therefrom positioned below said upper pivot arm member laterally extending portion, said lower pivot arm having an upwardly extending other end portion operable to abut said frame member second stop means,
   a servomechanism connected to said upper arm member laterally extending portion and said lower pivot arm member upwardly extending portion, said servomechanism operable to control the relative position of said upper and lower pivot arm laterally extending portions,
   disc members rotatably secured to said upper and lower pivot arm laterally extending portions, said disc members arranged in a plane substantially normal to the longitudinal axis of said arm member laterally extending portions, and
   drive means to rotate both of said disc members at substantially the same speed.

3. A device for slitting and scoring a continuously moving sheet comprising a base member positioned adjacent to an edge portion of a continuously moving sheet and having a lateral first guide portion,
   a frame member positioned on said first guide portion adjacent said moving sheet edge portion,
   said frame member having a pivot pin extending horizontally therefrom, first stop means adjacent the top portion of said frame, and second stop means extending horizontally therefrom below said first stop means,
   an upper pivot arm pivotally secured to said frame member on said pivot pin and having an end portion extending laterally from said frame member, said upper pivot arm having an upwardly extending end portion operable to abut said first stop means on said frame member, a lower pivot arm pivotally secured to said frame member on said pivot pin and having an end portion extending laterally therefrom positioned below said upper pivot arm member laterally extending portion, said lower pivot arm having an upwardly extending other end portion operable to abut said frame member second stop means,
   a servomechanism connected to said upper pivot arm member laterally extending portion and the said lower pivot arm member upwardly extending portion, said servomechanism operable to urge said lower pivot arm upwardly extending portion into abutting relation with said second stop means and thereafter pivot said upper arm member about said pivot pin so that said upper pivot arm upwardly extending portion is moved away from said first stop means,
   disc members rotatably secured to said upper and lower pivot arm laterally extending portions, said disc members arranged in a plane substantially normal to the longitudinal axis of said arm member laterally extending portions,
   drive means to rotate both of said disc members at substantially the same speed, and
   frame positioning means to move said frame member laterally on said base member.

4. A device for slitting and scoring a continuously moving sheet as set forth in claim 3 wherein said frame positioning means includes
   first adjustment means positioned on said base member and connected to said frame member, said adjustment means arranged to move said frame member laterally on said first guide portion relative to the longitudinal axis of said sheet to thereby position said sheet engaging members relative to the longitudinal axis of said continuously moving sheet.

5. A device for slitting and scoring a continuously moving sheet as set forth in claim 4 in which said base member has a second guide portion spaced laterally from said first guide portion, said first adjustment means positioned on said second guide portion and movable laterally thereon, and second adjustment means connected to said first adjustment means and operable to move said first adjustment means and said frame member laterally relative to the longitudinal axis of said moving sheet.

References Cited by the Examiner

UNITED STATES PATENTS

| | | | |
|---|---|---|---|
| 1,819,635 | 8/1931 | Biggert et al. | 83—433 |
| 2,664,950 | 1/1954 | Morgan et al. | 83—482 |
| 2,872,980 | 2/1959 | Perrine | 83—498 X |

ANDREW R. JUHASZ, *Primary Examiner.*